United States Patent [19]

Sankovic et al.

[11] Patent Number: 5,784,750

[45] Date of Patent: Jul. 28, 1998

[54] MULTI-COMPONENT FLOW PASSAGE ASSEMBLY WITH SNAP IN SEALING ADAPTOR

[75] Inventors: Denis Sankovic, Euclid, Ohio; Erik S. Larson, Framingham, Mass.; Martin Warchola, Medina, Ohio

[73] Assignee: The Scott Fetzer Company, Westlake, Ohio

[21] Appl. No.: 679,542

[22] Filed: Jul. 12, 1996

[51] Int. Cl.⁶ .................................................. A47L 9/00
[52] U.S. Cl. ...................... 15/246.2; 285/7; 285/361; 285/379
[58] Field of Search ..................... 285/379, 7, 361; 15/246.2

[56] References Cited

U.S. PATENT DOCUMENTS

| | | | |
|---|---|---|---|
| 1,137,382 | 4/1915 | Calvert | 285/379 X |
| 2,109,522 | 3/1938 | Boyle | 385/379 |
| 3,427,053 | 2/1969 | Dunlap et al. | 285/379 |
| 4,586,735 | 5/1986 | Innes | 285/379 X |

FOREIGN PATENT DOCUMENTS 2554827   7/1976   Germany ............................ 285/379

*Primary Examiner*—Dave W. Arola
*Attorney, Agent, or Firm*—Jones, Day, Reavis & Pogue

[57] ABSTRACT

A multi-component flow passage assembly is disclosed which incorporates an improved sealing adaptor structure. The adaptor includes a generally-cylindrical adaptor body with a rim for seating on the periphery of a first flow passage section, e.g. a vacuum cleaner horn. The adaptor body is made to include a bead which is received within a lip on the horn. The rim includes a sealing ring section in the shape of an O-ring for sealingly engaging the perimeter of a second flow passage section, which is connected to e.g. a vacuum cleaner attachment. The present assembly provides a better seal and simplified construction over previous devices.

10 Claims, 3 Drawing Sheets

MULTI-COMPONENT FLOW PASSAGE ASSEMBLY WITH SNAP IN SEALING ADAPTOR

BACKGROUND OF THE INVENTION

The present invention pertains to the field of a multi-component flow passage assembly of the type which uses a seal to provide a fluid-tight junction between the respective flow passage sections. This invention has particular applicability to the field of vacuum cleaners, particularly those that require a disengageable flow passage, so as to accommodate multiple interchangeable components such as a dust-collecting bag, a shampoo-receiving reservoir and a blower attachment.

Vacuum cleaners are known which use various attachments and other interchangeable components. It is important to maintain an air-tight condition throughout the flow passage so as to maximize the dirt removal efficiency of the air stream. However, it has been difficult to provide a device which is easily disengaged while still providing a fluid-tight seal at the junction.

A number of schemes had been contemplated previously for providing an air-tight seal for a disengageable flow passage. A gasket has been used to seal the respective flow passage sections at their junction. However, the gasket was found to not provide a secure enough seal so as to provide optimal dirt removal. A further development resulted in an adaptor which fitted around the end of a flow passage section, specifically the "horn" which is fixedly attached to the housing of the vacuum cleaner head. The adaptor was secured in place with rivets. However, it was found that air leakage still tended to occur along the rivets in parts which were not perfectly aligned, thereby reducing the dirt-removal efficiency of the vacuum.

SUMMARY OF THE INVENTION

In view of the drawbacks associated with previous devices, it would be advantageous to provide a multi-component flow passage assembly which solves the previous problems, thereby providing a more efficient flow passage.

Therefore, there is a need for a flow passage assembly which eliminates leaks.

There is also a need for a flow passage assembly with a seal which can be easily inserted and removed.

These needs and others are satisfied by the present flow passage assembly which includes first and second flow passage sections which are disengageably attached. An adaptor provides a seal between the respective flow passage sections. The adaptor comprises a generally-cylindrical adaptor body with a rim for seating on the perimeter of a junction end of one of the flow passage sections. A sealing ring is attached peripherally to the rim and engages the junction end of the respective other flow passage section. A bead is formed on the adaptor body which mechanically engages a cooperative structure on the flow passage section in order to securely retain the adaptor to the flow passage section.

As will be appreciated, the invention is capable of other and different embodiments, and its several details are capable of modifications in various respect, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE DRAWINGS

Figure 1:
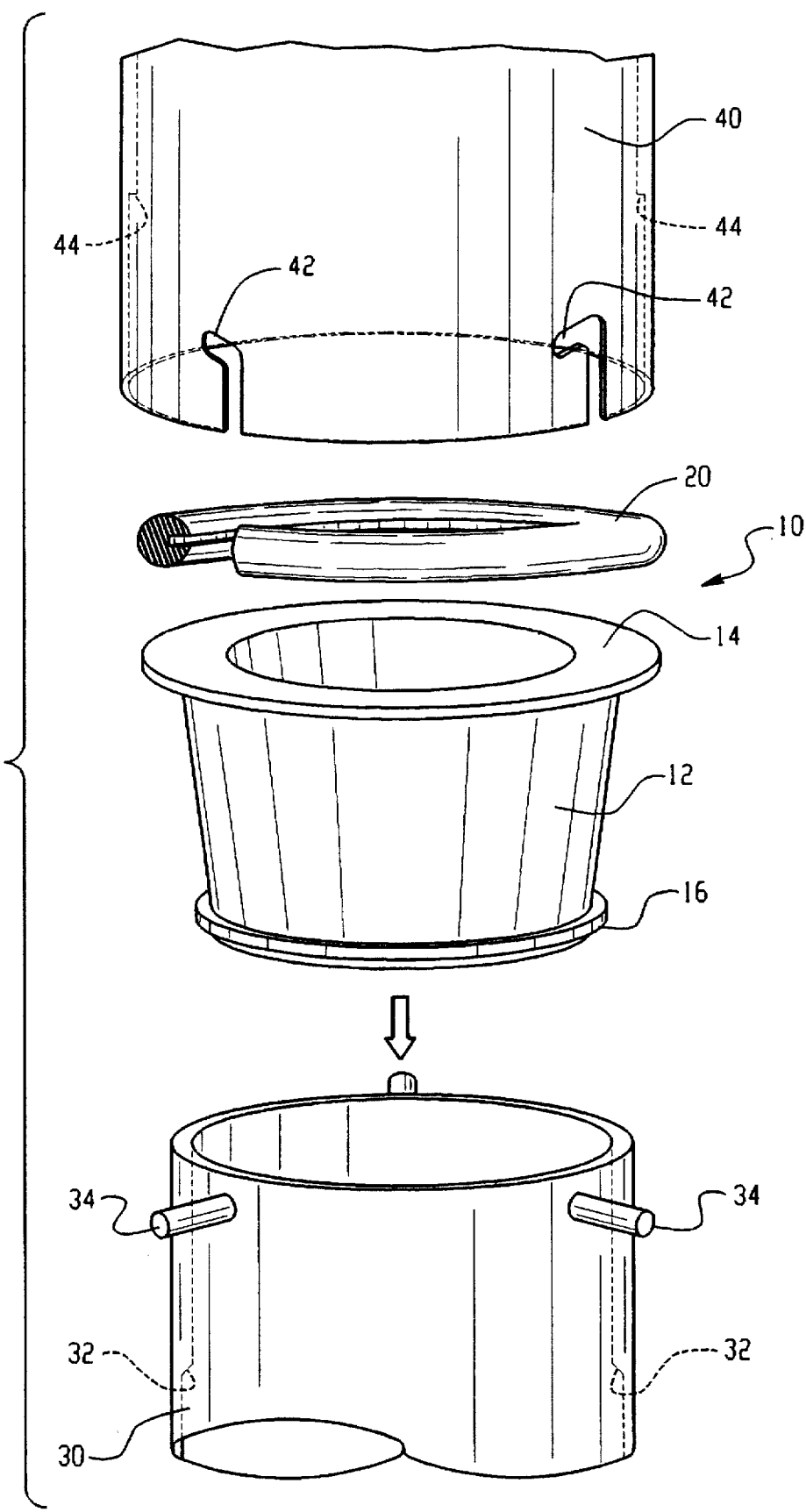
FIG. 1 is an exploded oblique view illustrating the components and operation of the flow passage assembly as according to a preferred embodiment of the present invention.
Figure 2:
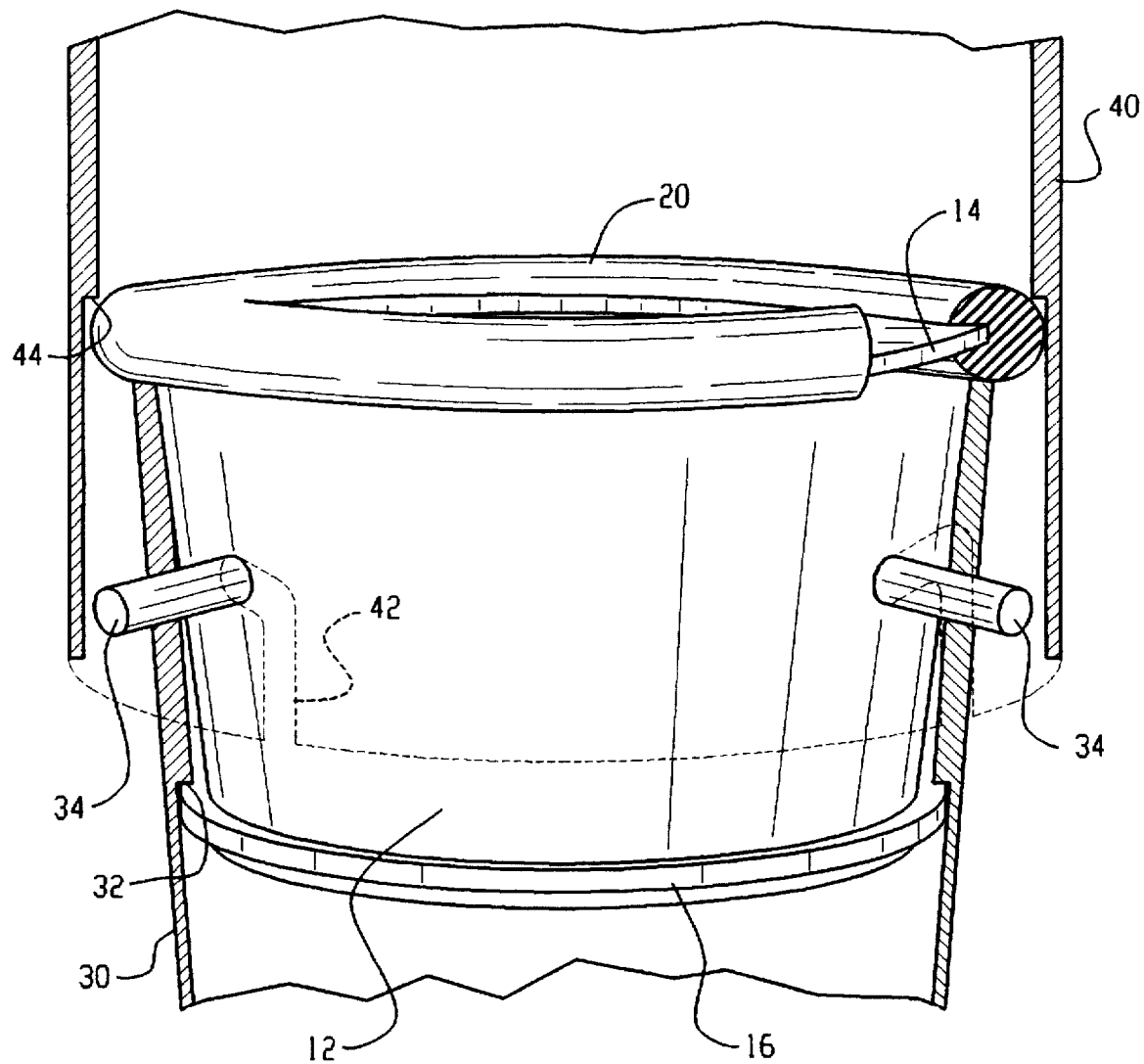
FIG. 2 is an oblique view showing the assembled flow passage assembly as according to a preferred embodiment of the present invention.

Referring now to the drawings which are for purposes of illustrating only the preferred embodiment of the present invention, the figures show a multi-component flow passage assembly. Turning to FIGS. 1 and 2, the present adaptor 10 is designed to securely fit within a first flow passage section, preferably a horn 30 of the type which connects to the impeller body of a vacuum cleaner.

The adaptor 10 includes a generally elongated adaptor body 12 which is preferably hollow and of a generally cylindrical shape. The adaptor body 12 can also be made to include a slight draft angle so as to facilitate release from a mold during manufacturing. The adaptor body 12 is made to fit into the interior of the horn 30 in such a way as to not appreciably reduce the diameter of the flow passage. The adaptor 10 also includes a rim 14, which is located substantially proximate to one end of the adaptor body 12. The rim 14 seats on the perimeter of the junction end of the horn 30.

Figure 3:
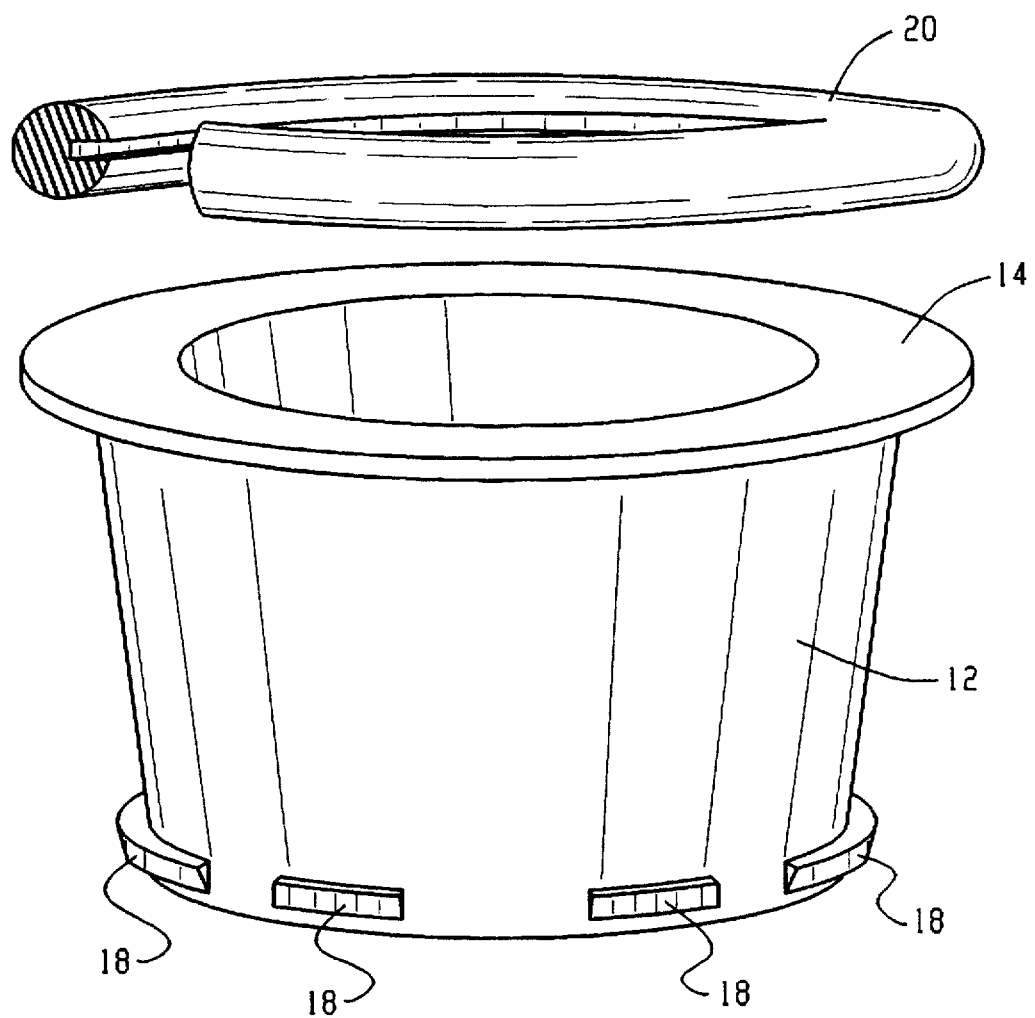
FIG. 3 is an exploded oblique view showing an alternative embodiment of the adaptor body of the present invention.

A bead 16 is located on the adaptor body 12 at a position spaced from the rim, preferably at or near the end opposite of the rim 14. The bead 16 mechanically engages a cooperative structure on the interior of the horn 30, preferably a lip 32, in order to securely retain the adaptor 10 to the horn 30. The bead 16 is shaped to be received by the lip 32. In the preferred embodiment, the bead 16 is a continuous annular ring, however the bead 16 can also be formed as a plurality of discontinuous fingers 18 (shown in FIG. 3), such as would occur to the person skilled in the art. Also, the adaptor body 12, the rim 14, and the bead 16 are preferably integrally formed, preferably as a one-piece molded component.

A sealing ring 20 is attached peripherally to the top of the rim 14 (shown in partial cut-away in the figures). The sealing ring 20 receives and sealingly engages the perimeter of a second flow passage section 40, preferably a section joined to a vacuum cleaner removable attachment such as a dust-collecting bag, a shampoo-receiving reservoir, or a blower attachment. The sealing ring 20 is preferably in the general shape of an O-ring and is preferably formed of an elastomeric material and overmolded around the rim 14 to form an integral unit. The second flow passage section 40 preferably joins to the first section 30 by a plurality of rivets 34 which cooperate with L-shaped channels 42. The sealing ring 20 is pressed between a ledge 44 inside the second section 40, and the rim 14 of the horn 30, thereby forming a good fluid seal. In an alternative embodiment, the sealing ring 20 can also be attached to the rim 14 using a chemical means (such as glue) or a mechanical means (such as a snap fit) or a combination of chemical and mechanical means.

The present invention, as described above, provides an excellent seal between two flow passage sections. Also, the present seal eliminates the need for separate distinct seals for each attachment, which were required with previous devices. The present adaptor can be made as an integral element, thus eliminating the various construction steps required for previous devices. Also, the present adaptor can be quickly and easily removed in the event of replacement and other servicing. Thus, the present invention has significant advantages over previous devices.

As described hereinabove, the present invention solves many problems associated with flow channel sealing assemblies and presents improved efficiency and operability. However, it will be appreciated that various changes in the details, materials and arrangements of parts which have been herein described and illustrated in order to explain the nature of the invention may be made by those skilled in the art within the principle and scope of the invention as expressed in the appended claims.

What is claimed:

1. A flow passage assembly for a vacuum cleaner comprising:
    a first flow passage section connected to an impeller body of the vacuum cleaner including an impeller for creating an air flow;
    a second flow passage section, disengageably attached to the first flow passage section, and connected to a removable attachment section for receiving the air flow generated by the impeller, wherein the attachment section is selected from the group consisting of a dust-collecting bag, a shampoo-receiving reservoir, and a blower attachment;
    an adaptor for providing a seal between the respective first and second flow passage sections, wherein said adaptor comprises:
        a generally elongated adaptor body which extends into the interior of a respective one of said first and second flow passage sections;
        a rim, located substantially proximate to one end of the adaptor body for seating on the perimeter of a junction end on the respective one of said first and second flow passage sections;
        a sealing ring, attached peripherally to the rim, for sealingly engaging the perimeter of a junction end on the respective other of said first and second flow passage sections; and
        a bead, located on said adaptor body at a position spaced from said rim, for mechanically engaging with a cooperative structure on the respective one of said first and second flow passage sections seated thereon, in order to securely retain the adaptor to the respective flow passage section.

2. The flow passage assembly of claim 1 wherein the sealing ring is formed of an elastomeric material and is integrally overmolded onto the rim.

3. The flow passage assembly of claim I wherein the sealing ring is formed of an elastomeric material and is connected to the rim in a manner selected from the group consisting of: chemical means, mechanical means and a combination of chemical and mechanical means.

4. The flow passage assembly of claim 1 wherein the sealing ring has generally an O-ring configuration.

5. The flow passage assembly of claim 1 wherein the adaptor body is of a substantially hollow cylindrical configuration.

6. The flow passage assembly of claim 1 wherein the bead is formed integrally with the adaptor body.

7. The flow passage assembly of claim 1 wherein the bead is located at the end of the adaptor body opposite the junction end.

8. The flow passage assembly of claim 1 wherein the bead is a continuous section around the perimeter of the adaptor body.

9. The flow passage assembly of claim 1 wherein the bead is a series of discontinuous fingers around the perimeter of the adaptor body.

10. The flow passage assembly of claim 1 wherein the bead has a sloped exterior surface and the cooperative structure is a lip on the interior of the respective one of said first and second flow passages, wherein the bead is shaped to be received by the lip.

* * * * *